US012343981B2

(12) United States Patent
Fogato et al.

(10) Patent No.: US 12,343,981 B2
(45) Date of Patent: Jul. 1, 2025

(54) INK-JET PRINTER FOR PRINTING ON CARDS

(71) Applicant: SICPA HOLDING SA, Prilly (CH)

(72) Inventors: Corrado Fogato, Borgofranco d'Ivrea (IT); Pier Luigi Soriani, Zubiena (IT)

(73) Assignee: SICPA HOLDING SA, Prilly (CH)

( * ) Notice: Subject to any disclaimer, the term of this patent is extended or adjusted under 35 U.S.C. 154(b) by 152 days.

(21) Appl. No.: 18/278,545

(22) PCT Filed: Feb. 23, 2022

(86) PCT No.: PCT/EP2022/054571
§ 371 (c)(1),
(2) Date: Aug. 23, 2023

(87) PCT Pub. No.: WO2022/180122
PCT Pub. Date: Sep. 1, 2022

(65) Prior Publication Data

US 2024/0294018 A1 Sep. 5, 2024

(30) Foreign Application Priority Data

Feb. 23, 2021 (EP) .................................... 21158611

(51) Int. Cl.
*B41J 11/00* (2006.01)
*B41J 3/407* (2006.01)
(Continued)

(52) U.S. Cl.
CPC ........... *B41J 11/0015* (2013.01); *B41J 3/407* (2013.01); *B41J 13/103* (2013.01); *B41J 13/12* (2013.01); *B41J 29/02* (2013.01); *H01T 23/00* (2013.01)

(58) Field of Classification Search
CPC ...... B41J 11/0015; B41J 3/407; B41J 13/103; B41J 13/12; B41J 29/02; H01T 23/00
See application file for complete search history.

(56) References Cited

U.S. PATENT DOCUMENTS 5,774,141 A 6/1998 Cooper et al.
6,478,485 B1 11/2002 Niestrath
(Continued)

FOREIGN PATENT DOCUMENTS

EP 2718109 7/2015
EP 2658723 6/2016
(Continued)

OTHER PUBLICATIONS

English Translation of JP 2014079971 (Year: 2014).*
International Search Report and Written Opinion issued with respect to application No. PCT/EP2022/054571.

*Primary Examiner* — Douglas X Rodriguez
*Assistant Examiner* — Tracey M McMillion
(74) *Attorney, Agent, or Firm* — MUNCY, GEISSLER, OLDS & LOWE, P.C.

(57) ABSTRACT

The present invention relates to the field of ink-jet printing technology. The present invention provides an ink-jet printer (1) for printing on cards comprising: a printer frame comprising a base frame (2); a support carriage (5) mounted on the base frame (2) for supporting a card (19) to be printed; a printing station (9) mounted to the printer frame for ink-jet printing on the top surface of the card (19), the printing station (9) comprising at least one print head (11); and an ion generator (30) mounted to the printer frame for emitting charged ions which can be sent to the top surface of the card (19).

10 Claims, 11 Drawing Sheets

(51) Int. Cl.

| | |
|---|---|
| ***B41J 13/10*** | (2006.01) |
| ***B41J 13/12*** | (2006.01) |
| ***B41J 29/02*** | (2006.01) |
| ***H01T 23/00*** | (2006.01) |

(56) References Cited

U.S. PATENT DOCUMENTS

| | | | | |
|---|---|---|---|---|
| 7,824,008 | B2 | 11/2010 | Barger et al. | |
| 2002/0092473 | A1 | 7/2002 | Sainty | |
| 2004/0135867 | A1 | 7/2004 | Schmitt et al. | |
| 2014/0225954 | A1 * | 8/2014 | Cappello .................. | B65H 9/00 347/16 |

FOREIGN PATENT DOCUMENTS

| | | | | |
|---|---|---|---|---|
| EP | 2658722 | | | 9/2016 |
| EP | 3248798 | | | 11/2017 |
| EP | 2658721 | | | 4/2018 |
| EP | 3395580 | | | 10/2018 |
| JP | 2014079971 | A | * | 5/2014 |
| JP | 2016132234 | | | 7/2016 |
| JP | 2016132567 | | | 7/2016 |
| JP | 2017124582 | | | 7/2017 |

* cited by examiner

INK-JET PRINTER FOR PRINTING ON CARDS

FIELD OF THE INVENTION

The present invention relates to the field of ink-jet printing technology, in particular, relates to an ink-jet printer for printing on cards, and more in particular, relates to an ink-jet printer for printing on cards made of plastic materials, for example, credit cards, smart cards, magnetic cards, etc.

BACKGROUND OF THE INVENTION

As known, credit cards, smart cards, magnetic cards etc. usually bear signs, images, trademarks, that help the users to identify the purpose of the cards and to distinguish each card from the others. U.S. Pat. No. 6,478,485 discloses a process and an apparatus for decorating an article which can be a card.

Furthermore, EP2658723, EP2658721, EP2658722 and EP2718109, which can be considered as a useful source of information with respect to this invention, discloses and illustrates some detailed characteristics of an ink-jet printer for printing on cards widely and thoroughly.

FIG. 1 and FIG. 2 illustrate an ink-jet printer 1 for printing on cards known in prior art. As illustrated in FIG. 1 and FIG. 2, the ink-jet printer 1 has base frame 2. Preferably a storage zone 3 in which one or more cards 4 are stored is arranged on the base frame 2. Preferably, the ink-jet printer 1 may be provided with a support carriage 5, on which a plate-like tray 6 is mounted. The plate-like tray 6 receives a card to be printed from the storage zone 3 and holds the card thereon. The plate-like tray 6 may be provided with a tray heater 7 which is embedded in the plate-like tray 6 and used for heating the card held thereon. The support carriage 5 is adapted to move the card held thereon within the ink-jet printer 1. In more detail, the support carriage 5 is arranged on a guide plate 20 mounted to the base frame 2 and is adapted to be guided along the guide plate 20. More specifically, the support carriage 5 receives the card to be printed from the card storage zone 3, by means of a picking station or an extraction station 8, and moves the card held thereon along the guide plate 20. The guide plate 20 brings such card to a printing station 9 so that the card is ink-jet printed by the printing station 9. Then the guide plate 20 and the support carriage 5 may also be used to take the card to an ejection station 10, where the card is moved away from the ink-jet printer 1 and received in a suitable container.

The printing station 9 comprises at least one print head 11 for ink-jet printing on the card. The printing station 9 comprises a driving system (not shown) adapted to move the print head 11 back and forth, along a preset path, so that the print head 11 can eject ink on the card during a sequence of steps regulated by a properly configured regulation unit (not shown). Preferably the print head 11 is slidably mounted on a support plate 12. In a preferred embodiment, the support plate 12 is transverse, and in particular perpendicular, to the moving path of the support carriage 5 or to the guide plate 20.

The extraction station 8 is adapted to extract a card 4 from the storage zone 3. The extraction station 8 picks one card 4 at a time from the storage zone 3 and places it on the support carriage 5. Subsequently, the card 4 is moved, along the guide plate 20, to the printing station 9, where the ink-jet printing action is performed, through the controlled ejection of ink onto the top surface of the card. After the ink-jet printing, the card 4 is moved towards the ejection station 10.

The ejection station 10 is configured to move the card 4 away from the support carriage 5 and, preferably, to make it land into a container.

The extraction station 8 is illustrated in more details in FIG. 3 and in FIG. 4 which is a cross-section according to line IV-IV in FIG. 3. The extraction station 8 comprises at least one main roller 13 which can be put in contact with the first card, at the bottom of the pile of cards 4 in the storage zone 3, for extracting from the storage zone 3 the first card, which becomes the picked card 19, destined to be printed. Preferably the main roller 13 is rotatably mounted to the base frame 2 below the storage zone 3, so that the weight of the pile of cards 4 helps to maintain the first card in contact with the main roller 13. In a preferred embodiment, an auxiliary weight is placed on the top of the pile of cards 4, in order to provide an additional component to the force that pushes the first card in contact with the main roller 13.

The extraction station 8 further comprises a plurality of auxiliary rollers 14, 15, 16, 17 and 18 mounted downstream the main roller 13 so as to engage the picked card 19 that advances due to the interaction with the main roller 13, to make it land onto the plate-like tray 6 fitted on top of the support carriage 5. More precisely, the auxiliary rollers 14-18 are positioned so as to receive the picked card 19 coming from the main roller 13 and bring the picked card 19 forward, along the direction indicated by the arrow F1 in FIG. 3, for allowing it to be processed for printing. In FIG. 5 it is illustrated that the picked card 19, just after exiting the auxiliary rollers 17 and 18 of the extraction station 8, has been already placed on the support carriage 5 and is movable along the guide plate 20.

The auxiliary rollers 14-18 define a reference plane which is substantially parallel to the plane of the plate-like tray 6, when the performed function of the extraction station 8 is to feed a card for printing. In certain conditions, the picked card 19 is not sent to the plate-like tray 6 mounted onto the support carriage 5, for printing; on the contrary, the auxiliary rollers 14-18 are moved by a suitable mechanism (not shown), so that the reference plane they define turns out to be inclined and the picked card 19 is moved towards an output, along the direction indicated by the arrow F2 in FIG. 4. The configuration of the extraction station 8 described in FIG. 4 does refer precisely to this auxiliary expelling function. However, FIG. 4 has mainly the purpose to illustrate in detail the position of the picked card 19 pinched by the auxiliary rollers 14-18.

During the extraction process, some friction takes place between the picked card 19 and the main roller 13 and auxiliary rollers 14-18. Due to triboelectric effect, the extraction process can cause the electrical charging of the picked card 19 which is generally made of a dielectric material, i.e. electrically insulating material. The generated electrical charges cannot move freely across the top surface of the card; on the contrary the generated electrical charges tend to be randomly stuck onto the picked card 19, with an unpredictable distribution across the top surface of the picked card 19.

Moreover, the origin of the triboelectric charging cannot be attributed to the sole friction with the main roller 13 and the auxiliary rollers 14-18. In fact, also the simple handling of the cards 4 made of the dielectric material before loading the storage zone 3 can make some unbalanced electrical charges onset onto the top surface of the card. In sum, very likely some unpredictable distribution of unbalanced electrical charges may have been established across the top surface of the picked card 19, when the latter is positioned onto the support carriage 5, ready for printing, as illustrated in FIG. 5. FIG. 6 illustrates the support carriage 5 which holds the picked card 19 and moves along the guide plate (not shown), following the direction indicated by the arrow P, towards the printing station 9.

The printing station 9 performs the printing action by means of, at least, one print head 11 slidably mounted on the support plate 12. The print head 11 is provided with a plurality of nozzles; all nozzles are electrically actuated in a controlled way, in order to produce the ejection of ink drops from a predetermined nozzle, the ink drop being directed towards a predetermined position on the top surface of the picked card 19. It is well known by those skilled in the art that the ink drop, during and after the ejection, may undergo fragmentation into a plurality of smaller parts, due to the dynamics of the ejection. This situation is illustrated in FIG. 7, where a nozzle 21 has ejected a small portion of ink 22 contained in the print head 11, in form of ink drops 23. More frequently, there is a main drop 24 which is big in front, with heavy mass and significant speed, followed by a plurality of smaller and often slower drops, often referred to as satellites 25. Some of the satellites 25 are made by many micrometric and submicrometric drops, with very small mass and low speed, often named aerosol 26. Briefly, each ejection from a determined nozzle turns out to produce a plurality of ink drops with different mass and speed.

It is easy to understand that the motion of the different ink drops can be diversely influenced by possible perturbations. In fact, the heaviest and fastest drops, i.e., the main drop 24, with large momentum, is hardly disturbed and follows nearly unperturbed trajectory. On the contrary, the smallest and slowest drops, and particularly the aerosol 26, are prone to be easily diverted from their paths by any possible perturbation, due to the small momentum. In other words, the ink drops with high momentum tend to hit the printing medium that means the top surface of the picked card 19 in the expected and predetermined position, whilst the ink drops with low momentum undergo a stronger influence from perturbations. In particular, the aerosol 26 composed of the smallest ink drops having very small speed and being often scattered all around under a perturbation frequently reaches unpredictable positions on the top surface of the picked card 19, distant from the predetermined landing point of the main drop 24 generated during the same ejection.

Among the possible perturbing agents, a frequent cause is air flow. The presence of a fan, whose effect could even reach the printing region, or just the simple back and forth movement of the print head and the support carriage, can act as perturbing agents, whose effect on the ink drop motion depends on the perturbation intensity and on the ink drop momentum.

Another significant perturbation agent able to influence the ink drop motion is the electrical field that may be present in the surrounding of the print head and particularly in the space between the nozzle and the printing medium, i.e., the picked card, where the trajectories of the ink drops take place. The electrical field acts on the picked card that has a net electrical charge, with either an attractive or repulsive force, depending on the polarity of the electrical charges. Furthermore, since the matter comprises positively and negatively charged components, the electrical field can displace the positive and negative electrical charges of the matter in separate directions, even though the net charge is zero, inducing what is termed polarization. It is well known to those skilled in the art that a polarized matter can be subject to a force from an electrical field, even though the net charge is zero, when the electrical field has a non-zero gradient, i.e. when the electrical field is spatially non-uniform.

In most cases, the liquid ink contained in the print head shows some electrical conductivity and it may comprise electrically charged components, having some mobility within the liquid ink. Therefore, the liquid ink can undergo the action of an electrical field and the motion of the ink drops can be influenced by an electrical field established in the space between the nozzle and the printing medium, i.e., the picked card.

The electrical field influences differently the fragmented portions of the ejected ink, due to the diversified mass and charge distribution among the ink drops. In particular, the motion of the aerosol is prone to be strongly influenced by an electrical perturbation, due to the small mass of the tiny ink drops, it consists of.

Many attempts to solve the issues do to the electrical perturbation in an ink-jet printer have been made, as shown for example, by U.S. Pat. Nos. 5,774,141 and 7,824,008, where either the gathering or the rejection of charged wandering ink drops is performed by means of additional electrically biased parts distributed nearby the print head and the printing region. However, during the printing of a card with an ink-jet printer, the printing defects that arise in some allegedly unpredictable way are still a disturbing drawback and need a more specific dealing.

In more detail, after printing some cards look as they were dirty. In other words, there are ink spots spread across the intended image. That means that small ink drops have been scattered around, distant from the predetermined landing points. The effect, often referred to as mist, is particularly severe and frequent at the boundary between a densely printed area and a sparsely printed area or even an entirely not printed area. This situation is described in FIG. **8*a* and FIG. 8*b*, where the intended printed image 27 in FIG. 8*a* is compared with the actual printed image 28 in FIG. 8*b*, the latter showing spurious ink spots 29** outside the intended image boundary.

Observing at high magnification the artifacts on the printed card, it turns out that most of them consist of very small spots of ink, likely produced by the aerosol deflection from its trajectory. Moreover, there is evidence to indicate that the card is often electrically charged, because of the extraction process and, possibly, also because of the previous card handling. The establishment of some electrical charges unevenly distributed across the top surface of the card can be shown using a suitable instrument, like a static meter. Therefore, it seems reasonable to attribute the cause of the ink spots over the card to the electrical field.

On the other hand, the conductivity of the ink seems to play a role in the most frequent distribution of the artifacts at the boundary between densely printed and sparsely printed regions. In fact, while the ejected ink is still liquid on the top surface of the card, the electrically charged components of the ink may be rearranged, somewhat mitigating the local static electrical charges on the top surface of the card. Such an effect may be more effective in the densely printed region, whilst in the sparsely printed region the mitigation would be poor.

Without wishing to be bound to theory, it is deemed that a strong gradient of the electrical field, enhanced by the non-uniformity of the surface charge distribution, can produce a deflection force with a remarkable component parallel to the surface. Such non-uniformity can be established because of the different effectiveness in mitigating the local electrical charges, resulting from the unlike ink distribution.

Following this thought, the plurality of small ink drops composing the aerosol may easily be polarized and deflected by the inhomogeneous electrical field, landing far from the predetermined position on the card.

To alleviate the electrical perturbation and, especially, to reduce the intensity of the electrical field gradient, some kind of neutralization of the effect of the electrical charges should be envisioned. For example, the support carriage onto which the card is placed during printing could be provided with a topmost grounded conductive layer with which the bottom surface of the card is in contact. However, this solution wouldn't be so effective in the shielding of the static electrical field at the top surface of the card, which is the ink landing surface, due to the card thickness.

SUMMARY OF THE INVENTION

In order to solve the above technical problems, the present invention provides an ink-jet printer in which an ion generator is arranged to send directly additional electrical charges, specifically some charged ions, onto the top surface of the card to be printed, in order to compensate the effect of the previous existing static electrical charges on the top surface of the card and solve the problem of the ink aerosol scattering in unwanted positions of the card, eliminating the mist issue.

Specifically, the present invention provides an ink-jet printer for printing on cards comprising: a printer frame comprising a base frame; a support carriage mounted on the base frame for supporting a card to be printed; a printing station mounted to the printer frame for ink-jet printing on the top surface of the card, the printing station comprising at least one print head; and an ion generator mounted to the printer frame for emitting charged ions which can be sent to the top surface of the card. Preferably, the ion generator is actuated before and during printing, with a variable duty cycle and a variable intensity.

Preferably, the ion generator is an air ionizer which emits alternatively positive charged ions and negative charged ions.

Preferably, the polarity of the emitted charged ions changes with a period of predetermined time to prevent the positive charged ions and negative charged ions from neutralizing each other before reaching the top surface of the card.

Preferably, the ion generator is a unipolar ion generator for emitting charged ions having a unique polarity and the charged ions are able to reach the top surface of the card by diffusion.

Preferably, the unipolar ion generator comprises: an ion generator case with an aperture for allowing the generated charged ions to go out; a pair of electrodes housed within the ion generator case; and a pair of electrical terminals, one for each electrode, connected with an ion generator power supply module aboard the ink-jet printer.

Preferably, the ink-jet printer comprises a mounting bracket for mounting the ion generator and the mounting bracket is fixed to the base frame.

Preferably, the printer frame further comprises a top frame connected with the base frame by side frames; and the ion generator is fixed to the top frame.

Preferably, the ink-jet printer further comprises a guide plate; the support carriage is arranged on the guide plate and is guided by the guide plate to move between a first position, in which the support carriage does not face the printer head, and a second position in which the support carriage faces the printer head; the printing station is able to move transversely to the guide plate above the guide plate; and the ion generator is out of the moving path of the printing station.

Preferably, the orthogonal projection of the ion generator in the base frame is in line with the center of the orthogonal projection of the support carriage in the base frame when the support carriage is in the second position.

Preferably, the ink-jet printer further comprises: a storage zone for storing at least one card to be printed; and an extraction station for extracting the card from the storage zone to the support carriage.

According to solutions of the present invention, the charged ions emitted by the ion generator in the ink-jet printer can be sent to the top surface of the card to be printed to compensate the effect of the previous existing static electrical charges on the top surface of the card, avoiding a significant presence of mist on the printed surface, i.e., avoiding a significant presence of spurious ink spots throughout the printed image.

BRIEF DESCRIPTION OF THE DRAWINGS

Non-restrictive and non-exhaustive embodiments of the present invention will be described by examples referring to the drawings below, wherein.

DETAILED DESCRIPTION OF THE EMBODIMENTS

In order to make the above and other features and advantages of the invention clearer, the invention is further described in combination with the attached drawings below. It is to be understood that the specific embodiments of the present invention are illustrative and not intended to be restrictive.

The present invention provides an ink-jet printer in which an ion generator is arranged to send directly additional electrical charges, specifically some charged ions, onto the top surface of the card to be printed, in order to compensate the effect of the previous existing static electrical charges on the top surface of the card.

Figure 1:
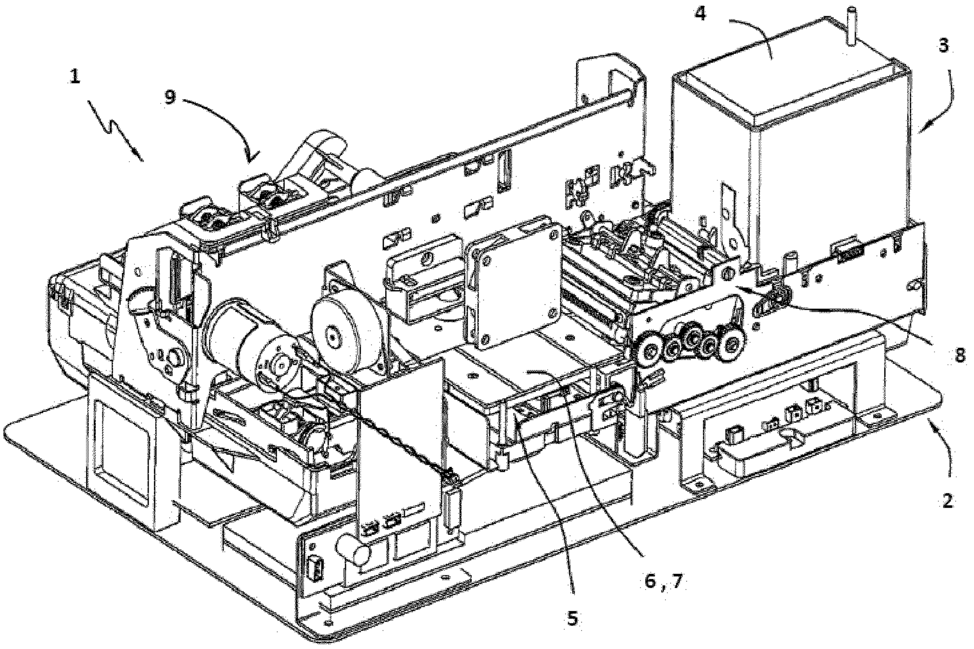
FIG. 1 illustrates a left side perspective schematic diagram of an ink-jet printer for printing on cards known in prior art.
Figure 2:
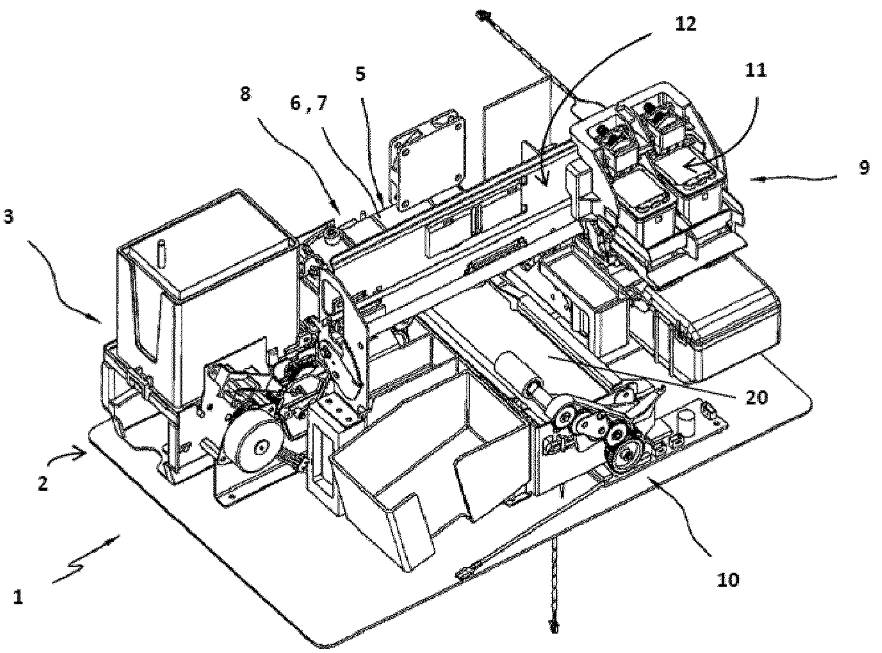
FIG. 2 illustrates a right side perspective schematic diagram of the ink-jet printer in FIG. 1.
Figure 3:
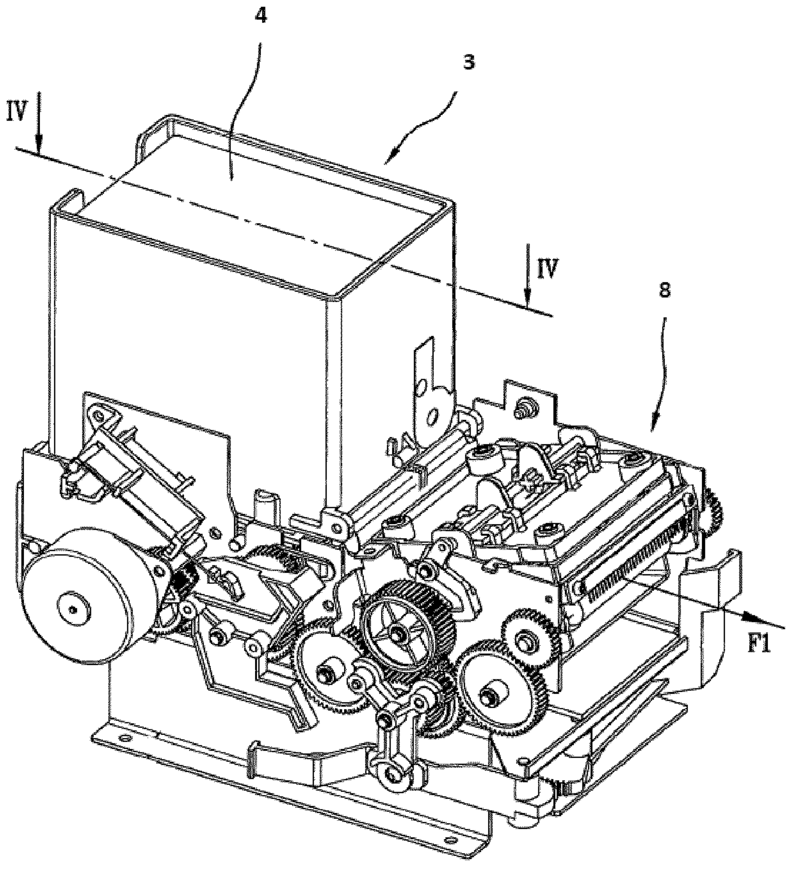
FIG. 3 illustrates a perspective schematic diagram illustrating a storage zone and an extraction station of the ink-jet printer in FIG. 1.
Figure 4:
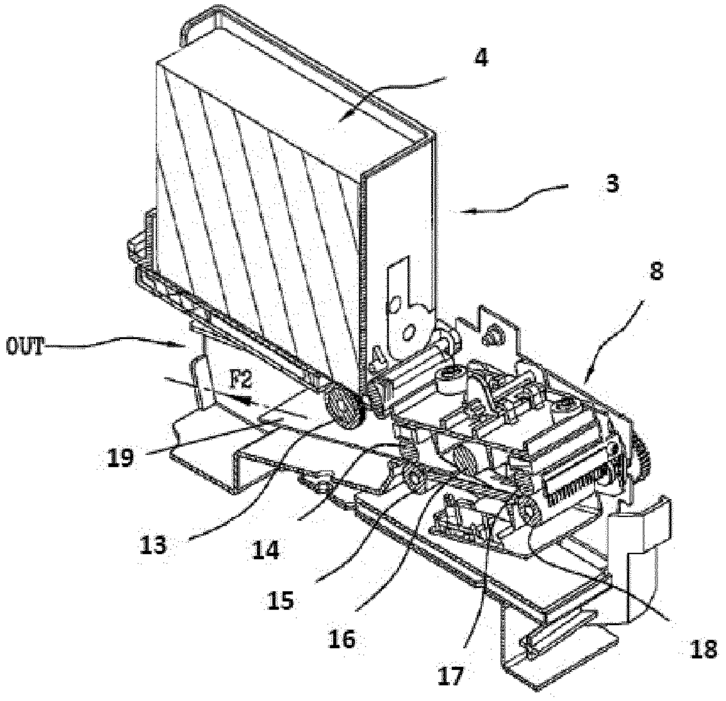
FIG. 4 illustrates a cross section view along the line IV-IV in FIG. 3.
Figure 5:
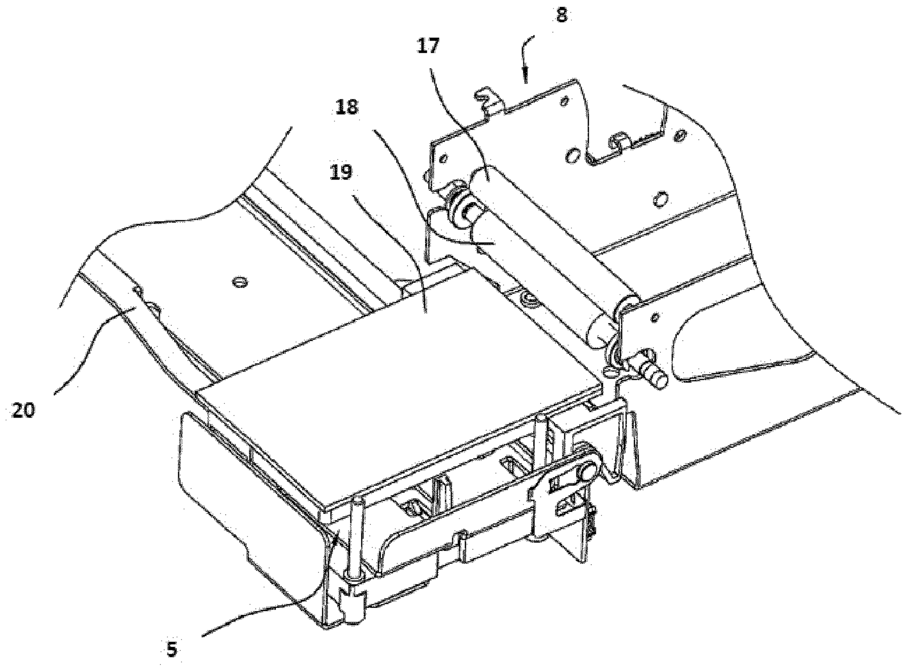
FIG. 5 illustrates a partial perspective schematic diagram illustrating a support carriage holding a picked card.
Figure 6:
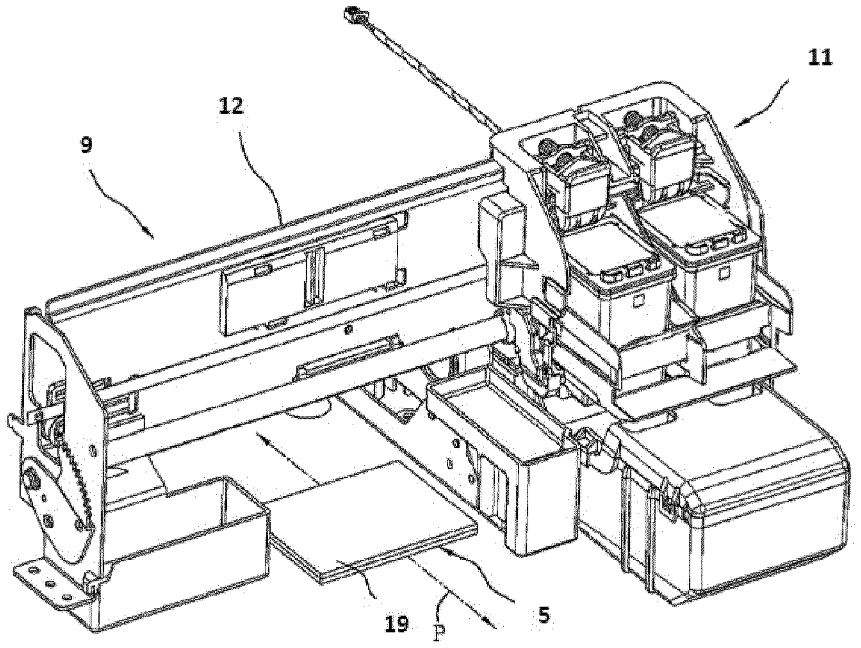
FIG. 6 illustrates a perspective schematic diagram illustrating a printing station of the ink-jet printer in FIG. 1.
Figure 7:
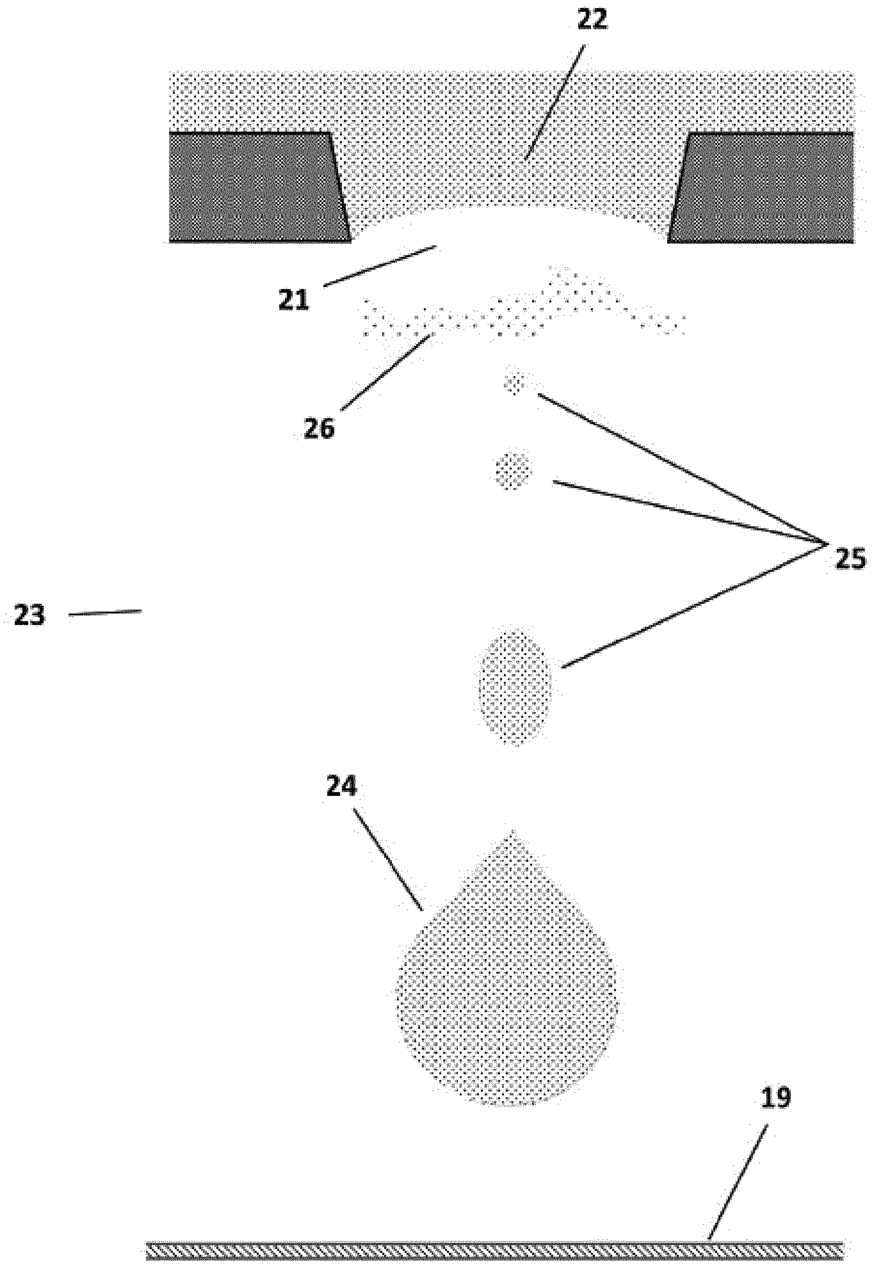
FIG. 7 illustrates a sketching view illustrating ink drops ejected by a nozzle of a print head.
Figure 8:
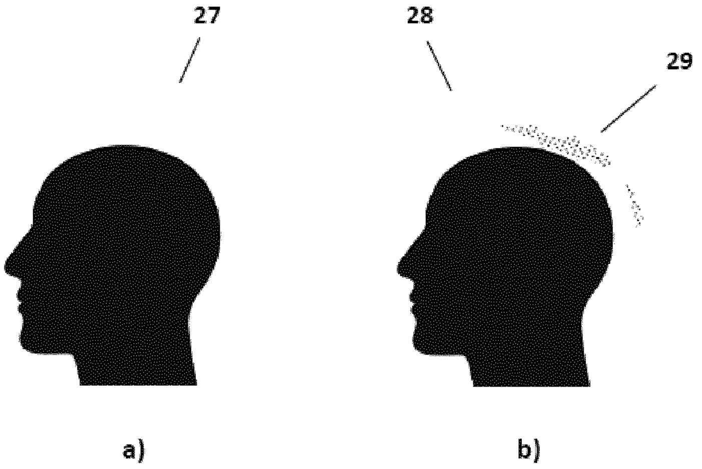
FIG. 8*a* illustrates an intended printed image.
FIG. 8*b* illustrates an actual printed image printed by the ink-jet printer in FIG. 1, wherein there are spurious ink spots outside the intended printed image boundary.
Figure 9:
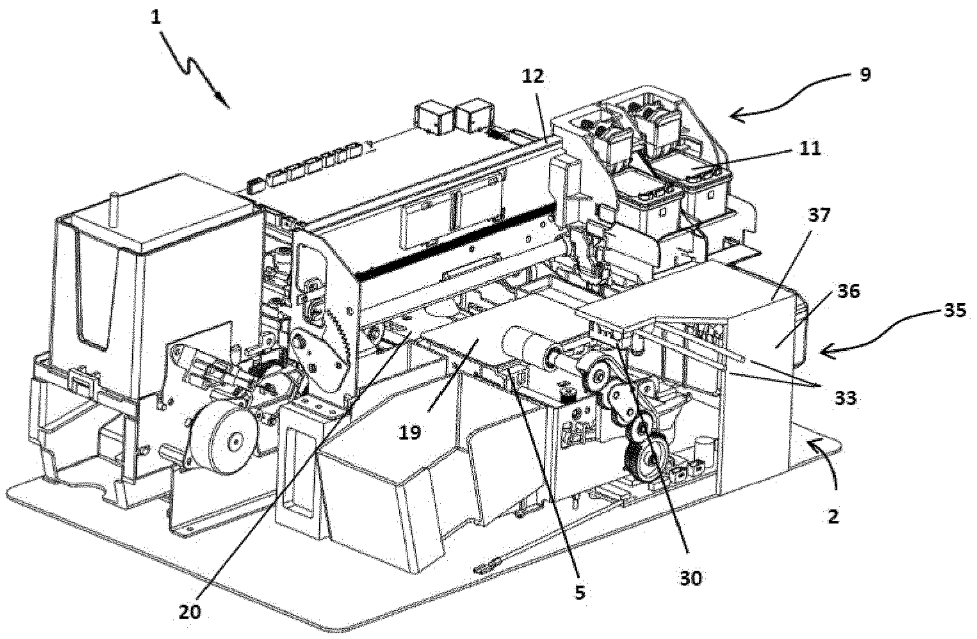
FIG. 9 illustrates a perspective schematic diagram of an ink-jet printer according to one embodiment of the present invention.

FIG. 9 illustrates a perspective schematic diagram of an ink-jet printer 1 according to one embodiment of the present invention. The ink-jet printer 1 is used for printing on cards such as credit cards, smart cards, magnetic cards. Preferably the cards comprise, or are made of, a thermoplastic material. In particular, the thermoplastic material may be selected from the group comprising: polyvinylchloride (PVC); polyvinylchloride (PVC) filled with mineral fillers; laminate polyvinylchloride (PVC); acrylonitrite-butadiene-styrene (ABS) terpolymers; polyethylenterephtalate (PET); glycol modified polyethylenterephtalate (PET-G); polylacticacid (PLA). The laminate polyvinylchloride is formed by a central layer of polyvinylchloride filled with mineral fillers, and a couple of transparent polyvinylchloride films applied each on a respective surface of the central layer. Also preferably the cards have a substantially plate-like shape, having a substantially rectangular shape with two larger sides and two smaller sides in a plant view.

As illustrated in FIG. 9, the ink-jet printer 1 comprises a printer frame which at least comprises a base frame 2. In additional, although not shown and not necessary, the printer frame may further comprise a top frame connected with the base frame 2 by side frames. Specifically, the lower ends of the side frames are connected to the base frame 2 and the upper ends of the side frames are connected to the top frame so that an accommodating space in which various components of the ink-jet printer 1 are accommodated is formed.

As illustrated in FIG. 9, the ink-jet printer 1 further comprises a support carriage 5 for supporting a card to be printed and a printing station 9 for ink-jet printing on the top surface of the card and comprising at least one print head 11 for ejecting on demand the ink drops onto the top surface of the card. The card supported on the support carriage 5 may be picked or extracted from a storage zone 3 for storing at least one card to be printed by a picking station or an extraction station 8, just as described above with reference to FIG. 1-FIG. 6. Therefore, in the embodiment illustrated in FIG. 9, the card supported on the support carriage 5 may also be referred as the picked card 19. The support carriage 5 is mounted on the base frame 2. The support carriage 5 may be mounted on the base frame 2 directly, i.e., the support carriage 5 may be fixed to the base frame 2. The support carriage 5 may also be mounted on the base frame 2 indirectly. For example, in the embodiment illustrated in FIG. 9, the support carriage 5 may be arranged on a guide plate 20 which is in turn mounted to the base frame 2. The support carriage 5 is guided by the guide plate 20 to move between a first position, in which the support carriage 5 does not face the printer head 11, and a second position in which the support carriage 5 faces the printer head 11. It could be understood that "the first position" may also be referred as an initial position or receiving position for receiving the picked card 19 onto the support carriage 5; and "the second position" may also be referred as a printing position for ink-jet printing on the top surface of the picked card 19. The printing station 9 is mounted to the printer frame. Specifically, in the embodiment illustrated in FIG. 9, the printing station 9 is mounted to a support plate 12 which is in turn fixed to the base frame 2. The printing station 9 is also able to move transversely, preferably perpendicular, to the guide plate 20 or the moving path of the support carriage 5 above the guide plate 20. Specifically, the print head 11 is slidably mounted on the support plate 12 which is transverse, and in particular perpendicular, to the moving path of the support carriage 5 or to the guide plate 20.

As mentioned above, very likely some unpredictable distribution of unbalanced electrical charges may have been established across the top surface of the picked card 19 when the latter is positioned onto the support carriage 5, ready for printing. In order to solve or at least alleviate the unpredictable distribution of unbalanced electrical charges across the top surface of the picked card 19, an ion generator 30 for emitting charged ions which can be sent to the top surface of the picked card 19 is provided in the ink-jet printer 1. The ion generator 30 is mounted to the printer frame. The ion generator 30 may be mounted to the printer frame directly. For example, the ion generator 30 may be fixed to the top frame of the printer frame. The ion generator 30 may also be mounted to the printer frame indirectly. For example, the ion generator 30 is mounted to the printer frame by a mounting bracket 35 fixed to the base frame 2. Specifically, the mounting bracket 35 comprises a vertical support 36 fixed to the base frame 2 and extending upwards from the base frame 2 and a horizontal support 37 connected to the upper end of the vertical support 36 and extending substantially horizontally, wherein the ion generator 30 is fixed to the horizontal support 37.

As a first approach, an air ionizer which emits alternatively positive charged ions and negative charged ions could be adopted as the ion generator 30 mentioned above. The negative charged ions and the positive charged ions emitted by the air ionizer can neutralize most of the previous existing static electrical charges on the top surface of the picked card 19, because the latter rejects the charged ions with the same polarity and attracts the charged ions with opposite polarity, until some charge balance is reached on the top surface of the picked card 19. In one embodiment, the positive charged ions and negative charged ions are delivered to the top surface of the picked card 19 through a gas flow. The gas flow can help push the positive charged ions or negative charged ions away before the ions of opposite polarity are generated to prevent the emitted alternative charged ions from neutralizing each other before reaching the top surface of the picked card 19. The gas flow may be an air flow, for example, a fan may be provided for providing the air flow. Sometimes different gas may also be used to form the gas flow. In addition, the polarity of the emitted charged ions changes with a period of predetermined time, usually several seconds, for example, 1~2 seconds, to enable the alternative charged ions flow to fit the actual electrical charge distribution on the top surface of the picked card 19, preventing furthermore the emitted alternative charged ions from neutralizing each other before reaching the top surface of the picked card 19. Such a long time would slow down the print yield of the ink-jet printer 1. Moreover, the gas flow which carries the alternative charged ions could represent a perturbation of the ink drop motion, in spite of the neutralization of the electrical charges on the top surface of the picked card 19 and thus of the compensation of the electrical field on the top surface of the picked card 19.

Figure 10:
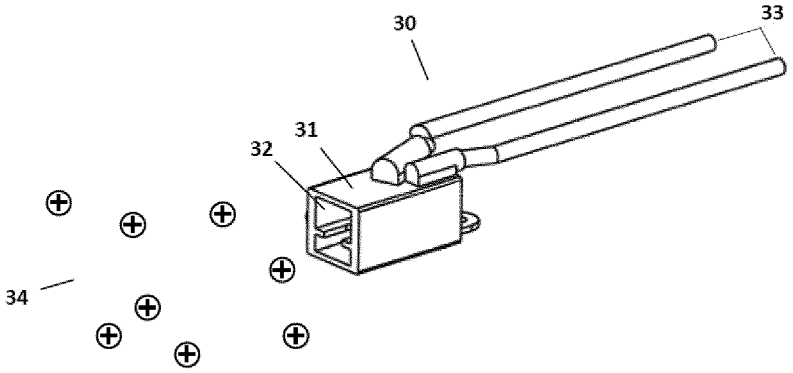
FIG. 10 illustrates a perspective schematic diagram of a unipolar ion generator in the ink-jet printer illustrated in FIG. 9.

As a more preferred approach, a unipolar ion generator, i.e., an ion generator of single polarity, for emitting charged ions having a unique polarity which are able to reach the top surface of the picked card 19 by diffusion without using any gas flow is provided in the ink-jet printer 1 as the ion generator 30. As illustrated in FIGS. 9 and 10, the unipolar ion generator comprises an ion generator case 31, a pair of electrodes (not shown) and a pair of electrical terminals 33. The ion generator case 31 is provided with an aperture 32 for allowing the generated charged ions to go out, spreading into the surrounding space. The electrodes are housed within the ion generator case 31. Two electrical terminals 33, one for each electrode, are connected with an ion generator power supply module (not shown) aboard the ink-jet printer 1. The generated charged ions 34, having a unique polarity, may be either positive (as illustrated in FIG. 10) or even negative, depending on the configuration of the unipolar ion generator. Since the charged ions 34 having a unique polarity, there is no risk of any "ion neutralization". In this circumstance, the charged ions 34 are able to reach the top surface of the picked card 19 by diffusion without using any gas flow and, therefore, there isn't any perturbation caused by any gas flow.

Although the charged ions 34 having a unique polarity can hardly produce the electrical charge balance on the top surface of the picked card 19, neutralizing the previous existing static electrical charges on the top surface of the picked card 19, the generated charged ions 34 will have a different impact rate from point to point, depending on the distribution of the previous existing static electrical charges. For example, let's suppose there is a non-uniform electrical charge distribution across the top surface of the picked card 19. Specifically, let's suppose there are positively charged regions and uncharged regions across the top surface of the picked card 19 and the generated charged ions 34 are positive as well. Since the electrical field in the charged region is stronger, the generated charged ions 34 which are positive are easily rejected when they get closer to the charged regions of the top surface of the picked card 19 (maybe some generated charged ions 34 will arrive anyhow at a very slow rate onto the top surface of the picked card 19); on the contrary, at the uncharged regions the impact rate of the generated charged ions 34 which are positive will remain high and the top surface of the uncharged regions tends to acquire increasingly some positive electrical charges. Since the impact rate is expected to be higher if the positive charge density is lower (fewer rejected ions), the trend is to reach a balanced situation, with a more uniform positive charge distribution across the top surface of the picked card 19. As an alternative, let's suppose there are negatively charged regions and uncharged regions across the top surface of the picked card 19 and the generated charged ions 34 are still positive. The generated charged ions 34 will have a higher impact rate (because they are attracted) on the negatively charged region than on the uncharged region. Therefore, the negatively charged region loses its negative electrical charges more rapidly than the uncharged region gathers positive electrical charges. The final result will be the same: some uniform positive charge will establish across the top surface of the picked card 19. It would be understood that reversing the polarity of the generated charged ions 34 won't affect the final uniformity of the electrical charge on the top surface of the picked card 19: simply the final situation will be a uniform negative charged surface. Anyway, the overall effect of these charged ions 34 is likely the reduction of the gradient value across the top surface of the picked card 19, notwithstanding that the net electrical charge hasn't been nullified. In other word, the emitted charged ions may produce a more uniform charge distribution on the top surface of the card and therefore a more homogeneous electrical field nearby the top surface of the card, without making the card itself a neutral body. Therefore, the unipolar ion generator fitted in the ink-jet printer 1 may be either a positive or a negative ion generator, without affecting the efficiency of the solution.

Figure 11:
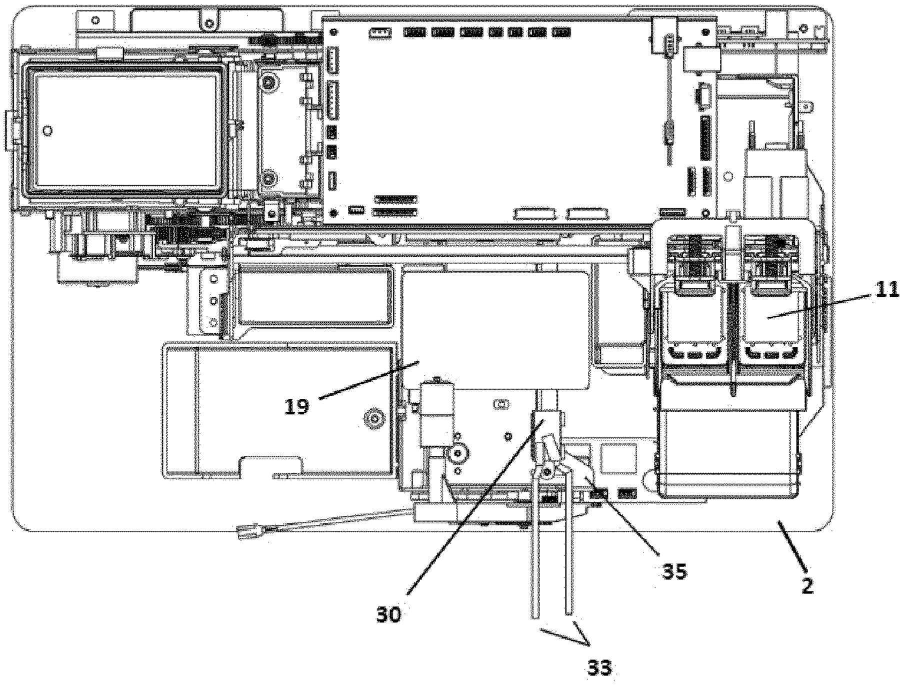
FIG. 11 illustrates a top view of the ink-jet printer illustrated in FIG. 9.

FIG. 11 is a top view of the ink-jet printer 1 illustrated in FIG. 9. As can be clearly seen from FIG. 11, the ion generator 30 is out of the moving path of the printing station 9, preventing any mechanical interference with the moving print head 11 of the printing station 9. Moreover, the orthogonal projection of the ion generator 30 in the base frame 2 falls out of the perimeter of the picked card 19 when the picked card 19 is positioned in the printing position. In addition, since the generated charged ions can cover some distance, the ion generator 30 doesn't need to be too close to the picked card 19, nor to be in line with the center of the picked card 19 to perform effectively its function, as appears from FIG. 11. Of course, it is preferable that the orthogonal projection of the ion generator 30 in the base frame 2 is in line with the center of the orthogonal projection of the support carriage 5 or of the picked card 19 in the base frame 2 when the support carriage 5 is in the second position since the symmetrical positioning of the ion generator 30 would produce a more uniform effect.

The ion generator 30 may be actuated before and during printing, with a variable duty cycle and a variable intensity, at the option. According to an embodiment, when the ion generator 30 is actuated with a variable duty cycle, the ion generator 30 is actuated during some sequences of printing and is not actuated during other sequences of printing. For example, in a multiple layer printing mode the ion generator 30 may be active during the printing of the totality of the layers or it may be actuated only during a subset of the layers, depending on the geometrical layout of the printer modules, on the card material, on the ink composition, etc. in order to get the maximum of the electrical charge uniformity without causing the electrostatic sticking of the card due to an excessive amount of electrical charges on the top surface of the card. As an example, during a card printing with only 4 layers, the duty cycle of the ion generator 30 can be 100%, i.e. the ion generator 30 is always switched on, whilst with 16 layers the duty cycle of the ion generator 30 can be in the range 25% to 50%. For example, with 16 layers, the ion generator 30 can operate during the printing of the first layer in a group of four and is switched off during the subsequent three layers; the sequence is repeated four times in this example.

According to an embodiment, when the ion generator 30 is actuated, the ion generator 30 generates a flux of ions; said ions flux comprises said generated charged ions 34. When the ion generator 30 is actuated with a variable intensity, said ions flux is variable, i.e. the number of generated ions 34 varies in time. For example, depending of the material of the card and/or of the nature of the ink and/or the number of layers to be printed, it can be advantageous to adjust the intensity of the ion generator 30 to optimize the effect of the generated charged ions 34 on the top surface of the card. According to an embodiment, the ion generator 30 is mounted in a certain fixed position with respect to the printer frame, controlling the duty cycle of the ion generator 30 and/or the intensity of the ion generator 30, i.e. the intensity of the ions flux, allows the adjustment of the operating conditions of the ion generator 30. For example, the intensity of the ion generator 30 can be adjusted tuning its power supply.

For example, if the ion generator 30 works with a 12 Volt DC power supply, it is possible to vary the intensity of the ions flux by varying the value of the power supply. By reducing the power supply value down to 6 Volts DC, for example, the ion generator 30 generates charged ions 34 with a lower intensity. According to an embodiment, switching on or off the ion generator 30 may also be a way to vary its intensity. According to an embodiment, the variability of the ion generator 30 can be understood as the variability of the ions flux due to an adjustment of the power supply of the ion generator 30. For example, switching on or off the power supply of the ion generator 30 leads to a variability of the ions flux. For another example, increasing or decreasing the value of the power supply of the ion generator 30 leads to a variability of the ions flux.

In order to quantify the variability of the intensity when the value of the power supply is tuned, an experiment has been realized wherein the ion generator 30 is placed at a fixed distance (10 cm in this experiment) with respect to a monitored charged plate. Said monitored charged plate is brought to 0 Volts and then is disconnected from any voltage source, i.e. its voltage is left practically floating. In fact, the voltage onto the plate is monitored with an oscilloscope, using a high impedance cable, in order to perturb as little as possible, the electrical state of the plate. After starting the waveform acquisition, the ion generator 30 is switched on generating in this experiment negative ions, the value of the power supply is kept at a certain fixed value in the range 6 Volts to 12 Volts. During this experiment, an increasing negative voltage is established onto the monitored plate. In the long time, said negative voltage tends to be pinned to a negative value following an asymptotic curve. This experiment is then reproduced with different values of the power supply to check if this induces a modification in the time needed to reach this negative value. In this experiment, the time necessary to reach a certain voltage level (−400 Volts and −800 Volts, respectively) depending on the DC power supply level applied to the ion generator 30 has been checked. This experiment shows that the higher the applied power supply voltage, the shorter the needed time necessary to reach the predetermined voltage level. The relationship between the value of the power supply and said time taken is non-linear, as demonstrated in the following table:

| DC Power Supply | −400 Volts | −800 Volts |
|---|---|---|
| 6 Volts | 1.4 sec. | 26 sec. |
| 8 Volts | 0.34 sec. | 1.3 sec. |
| 10 Volts | 0.18 sec. | 0.54 sec. |
| 12 Volts | 0.14 sec. | 0.38 sec. |

This experiment shows clearly that the dynamic range of the ion generation 30 efficiency is very large and the fine tuning, even depending on the printing mode, can be obtained with a small voltage adjustment of the ion generator 30 power supply. Advantageously, the tuning of the value of the power supply can easily be done using a simple circuitry such as a voltage divider or a potentiometer.

As described hereafter, the use of an ion generator 30 with a variable duty cycle and/or a variable intensity allows to solve various technical problems, for example, in the case of printing on a plastic card comprising a non-homogenous charge distribution. Usually, in this use case, the plastic card surface can comprise different regions with different electrical charges. In this example, the plastic card comprises two different regions, each with a different electrical charge. According to an embodiment, the ion generator 30 is configured to reduce the difference between the two regions regarding the electrical charges, minimizing in turn also the electrical charge gradient, which causes the droplets deviation previously described. The elimination or at least the strong reduction of the net charge can be achieved by the ion generator 30. Moreover, if the polarity of the emitted ions is opposite to the charge of the card, the ion generator 30 allows to strongly reduce or even eliminate the net charge of the card. In some situations, in the long time the polarity of the charge could even be reversed if the ions flow continues. On the contrary, if the polarity of the ions is the same as the charge of the card, the ion generator 30 allows to reach a balance between the two regions of the card. Nevertheless, in some situations, the ions flux can be progressively more and more rejected by the card electric field. Therefore, in some situations, only a slow net charge increasing can happen in the long time, for example when a lot of layers must be printed on the same card. Therefore, the use of a variable duty cycle is a solution to overcome this drawback, especially in relation with the number of layers applied during the printing. Being able to adjust the operating conditions of the ion generator 30 using a variable duty cycle and/or a variable intensity increases the number of degrees of freedom of the ion generator 30 to overcome technical issues due to the variability of printing conditions.

The presence of a nearly uniform charge distribution and the resulting electrical field doesn't represent a drawback in itself. In fact, during the ink drop ejection, the electrical field can attract the charged components of the ink drop having a certain polarity, which concentrate into the head of the drop; the latter turns into the big main drop after fragmentation and it is attracted towards the top surface of the card, without any significant deflection, as it is known by those skilled in the art. On the other side, the tiny ink drop at the tail, which constitute the aerosol having small mass and low speed, are rejected back if they have the opposite polarity with respect to the main drop or, if they are neutral, can continue along their original trajectory, due to the abatement of the electrical gradient.

It should be pointed out that the effective charge uniformization would require about half a second or less, which is perfectly compatible with the print yield requirement of an ink-jet printer for printing on cards. The invented solution can allow an ink-jet printer to print hundreds of cards without even noticing a significant presence of mist on the printed surface, i.e., without a significant presence of spurious ink spots throughout the printed image.

Various technical features described above may be combined arbitrarily. Although not all of possible combinations of various technical features are described, but all the combinations of these technical features should be regarded as within the scope described in the present specification provided that they do not conflict.

Notwithstanding the description of the invention in combination with embodiments, those skilled in the art shall understand that the above description and drawings are only illustrative and not restrictive and the invention is not limited to the embodiments disclosed. Various modifications and variations are possible without departing from the concept of the invention.

LIST OF DESIGNATIONS

1 Ink-jet printer
2 base frame
3 storage zone
4 card
5 support carriage
6 plate-like tray
7 tray heater
8 extraction station
9 printing station
10 ejection station
11 print head
12 support plate

13 main roller
14, 15, 16, 17, 18 auxiliary rollers
19 picked card
20 guide plate
21 nozzle
22 ink
23 ink drop
24 main drop
25 satellites
26 aerosol
27 intended printed image
28 actual printed image
29 spurious ink spots
30 ion generator
31 ion generator case
32 aperture
33 electrical terminal
34 charged ion
35 mounting bracket
36 vertical support
37 horizontal support

What is claimed is:

1. An ink-jet printer for printing on cards comprising:
- a printer frame comprising a base frame;
- a support carriage mounted on the base frame for supporting a card to be printed;
- a printing station mounted to the printer frame for ink-jet printing on the top surface of the card, the printing station comprising at least one print head; and
- an ion generator mounted to the printer frame for emitting charged ions which can be sent to the top surface of the card,
- wherein the ion generator is actuated before and during printing, with a variable duty cycle and a variable intensity.

2. The ink-jet printer according to claim 1, wherein the ion generator is an air ionizer which emits alternatively positive charged ions and negative charged ions.

3. The ink-jet printer according to claim 2, wherein the polarity of the emitted charged ions changes with a period of predetermined time to prevent the positive charged ions and negative charged ions from neutralizing each other before reaching the top surface of the card.

4. The ink-jet printer according to claim 1, wherein the ion generator is a unipolar ion generator for emitting charged ions having a unique polarity and the charged ions are able to reach the top surface of the card by diffusion.

5. The ink-jet printer according to claim 4, wherein the unipolar ion generator comprises:
- an ion generator case with an aperture for allowing the generated charged ions to go out;
- a pair of electrodes housed within the ion generator case;
- a pair of electrical terminals, one for each electrode, connected with an ion generator power supply module aboard the ink-jet printer.

6. The ink-jet printer according to claim 1, wherein the ink-jet printer comprises a mounting bracket for mounting the ion generator and the mounting bracket is fixed to the base frame.

7. The ink-jet printer according to claim 1 wherein the printer frame further comprises a top frame connected with the base frame by side frames; and the ion generator is fixed to the top frame.

8. The ink-jet printer according to claim 1, wherein the ink-jet printer further comprises a guide plate; the support carriage is arranged on the guide plate and is guided by the guide plate to move between a first position, in which the support carriage does not face the printer head, and a second position in which the support carriage faces the printer head; the printing station is able to move transversely to the guide plate above the guide plate; and the ion generator is out of the moving path of the printing station.

9. The ink-jet printer according to claim 8, wherein the orthogonal projection of the ion generator in the base frame is in line with the center of the orthogonal projection of the support carriage in the base frame when the support carriage is in the second position.

10. The ink-jet printer according to claim 1, wherein the ink-jet printer further comprises:
- a storage zone for storing at least one card to be printed; and
- an extraction station for extracting the card from the storage zone to the support carriage.

* * * * *